Jan. 27, 1931.    H. E. ANDERSON    1,790,362
AUTOMATIC SLACK ADJUSTER FOR BRAKE RIGGING
Filed Nov. 15, 1930    3 Sheets-Sheet 1

INVENTOR
Harley E. Anderson
BY
Harry Lea Dodson
ATTORNEY

Jan. 27, 1931. H. E. ANDERSON 1,790,362
AUTOMATIC SLACK ADJUSTER FOR BRAKE RIGGING
Filed Nov. 15, 1930  3 Sheets-Sheet 2
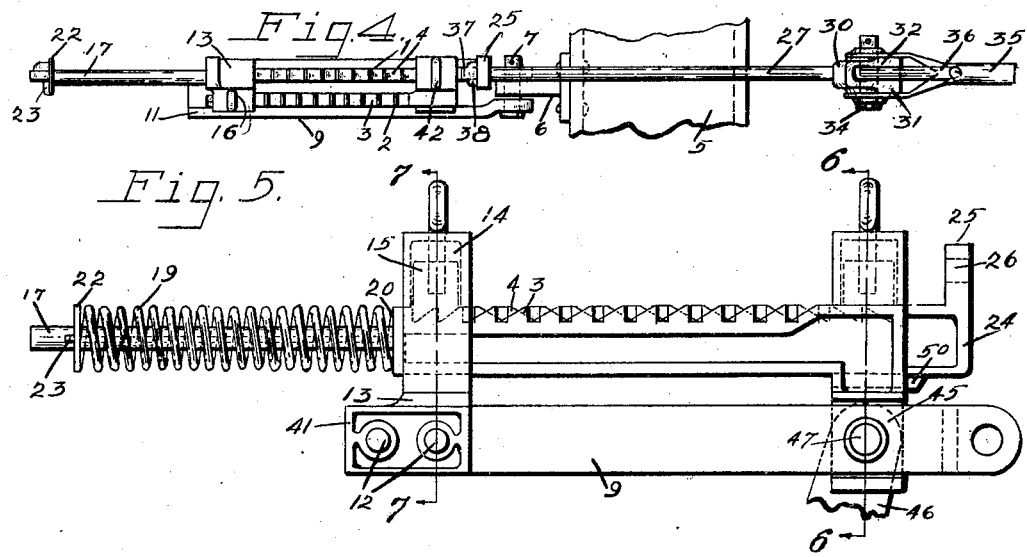
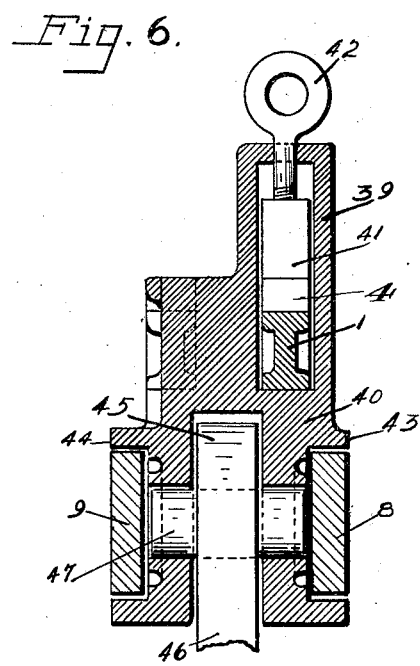
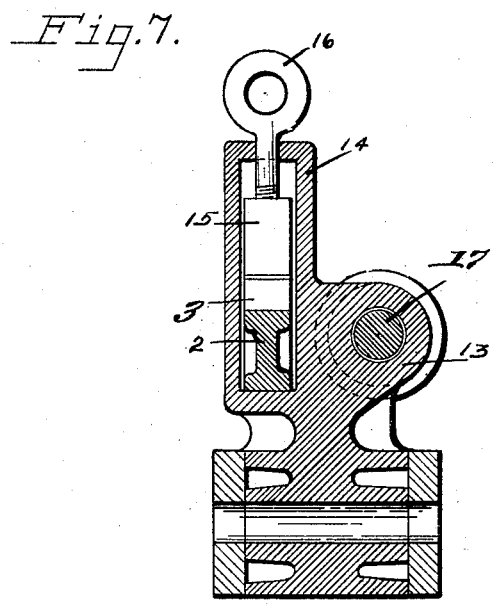
INVENTOR
Harley E. Anderson
BY
Harry Leo Dodson
ATTORNEY Jan. 27, 1931. H. E. ANDERSON 1,790,362
AUTOMATIC SLACK ADJUSTER FOR BRAKE RIGGING
Filed Nov. 15, 1930 3 Sheets-Sheet 3
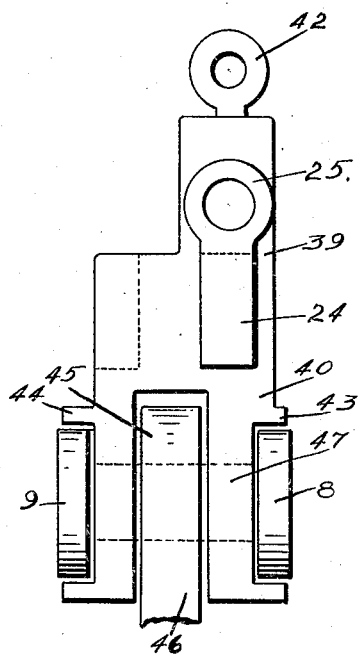
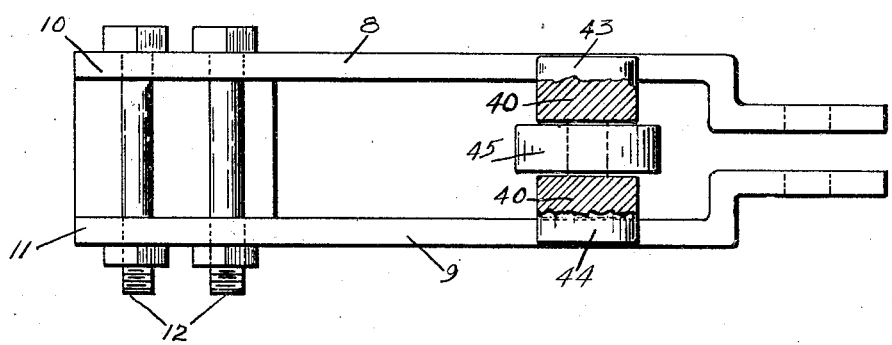
INVENTOR
Harley E. Anderson
BY
Harvey Lea Dodson
ATTORNEY Patented Jan. 27, 1931

1,790,362

UNITED STATES PATENT OFFICE

HARLEY E. ANDERSON, OF KANSAS CITY, MISSOURI, ASSIGNOR TO GUSTIN-BACON MANUFACTURING CO., OF KANSAS CITY, MISSOURI, A CORPORATION OF MISSOURI

AUTOMATIC SLACK ADJUSTER FOR BRAKE RIGGING

Application filed November 15, 1930. Serial No. 496,010.

My invention relates to that class of slack adjusters which are designed to automatically compensate for the wear on the brake shoes so that the required piston travel will be maintained, and which holds the brake levers and cylinder levers at right angles, to the center line of the car, which is the ideal point from which they should be operated.

Devices of this kind with which I am familiar are so constructed that if the brakes are applied for a long time continuously, as down a long mountain grade, the automatic feature of the slack adjuster will prevent any increased piston travel because of the brakes remaining on so long they begin to burn off, as the device would be moved against the stop bracket and stop any further travel of the top rods. Some of the slack adjusters of this type, with which I am familiar, are affected by a car rounding a curve which has a tendency to allow the adjuster to come against the stop bracket closer than when the car is on a straight track, thus tightening the brakes.

My invention has for its principal object to provide a device which will automatically move the top or fulcrum point of each dead lever back and towards the wheels as the brake shoes wear.

A further object is to hold and control four brake levers at all times, that is to say the two truck live levers and the cylinder and floating levers at right angled positions.

It has generally been understooood that the dead lever could not be moved because it practically has no movement when the brakes are applied. In fact that is the reason why it is called the dead lever.

My invention has for its further object to move this dead lever automatically as the brake shoes wear.

A further and important object of my invention is to construct a device which will not require the drilling of any holes in the car frame in order to mount the device on any freight car.

A further object of my invention is to provide a construction in which the adjuster will not prevent the brake cylinder piston from creeping on out to the end of its maximum travel, in the case of a mountain grade, where the brake shoes are burning, my construction providing for the brake cylinder piston to have four inches of more travel before the piston will strike the non-pressure head and four inches additional travel of the live lever and the top rods will increase the piston travel to increase two inches before the adjuster will take up. It follows that the fouling of the brake rigging, in any way, is entirely avoided, but as soon as the brakes are released the adjusters will automatically operate, readjust the piston travel to what it was originally set at, which is the requirement for air brake piston travel on railroads.

My means of accomplishing the foregoing objects may be more readily comprehended by having reference to the accompanying drawings which are hereunto annexed and made a part of this specification, in which—

Fig. 1 is a side elevation, of my improved device applied to a truck of a freight car, the non-essential parts being indicated by dotted lines. This is a standard A. R. A. truck the bolster being shown in section through the center or just a little at one side of the center and exactly at the point where the top of the dead lever is attached to the truck bolster. It will, of course, be understood, by persons skilled in the art, that the top of the live lever is in direct line with the top of the dead lever, only that it is on the opposite side of the bolster;

Fig. 4 is a top or plan view of the device as shown in Fig. 1;

Fig. 5 is an enlarged detail view of the device showing the manner in which the ratchet teeth of the racks are inclined;

Fig. 6 is an enlarged view taken in section on the line 6—6 in Fig. 5;

Fig. 7 is an enlarged view taken in section on the line 7—7 in Fig. 5;

Fig. 8 is an end elevation of the device as shown in Fig. 6, the rod 27 being omitted for the sake of clearness; and

Figure 1:
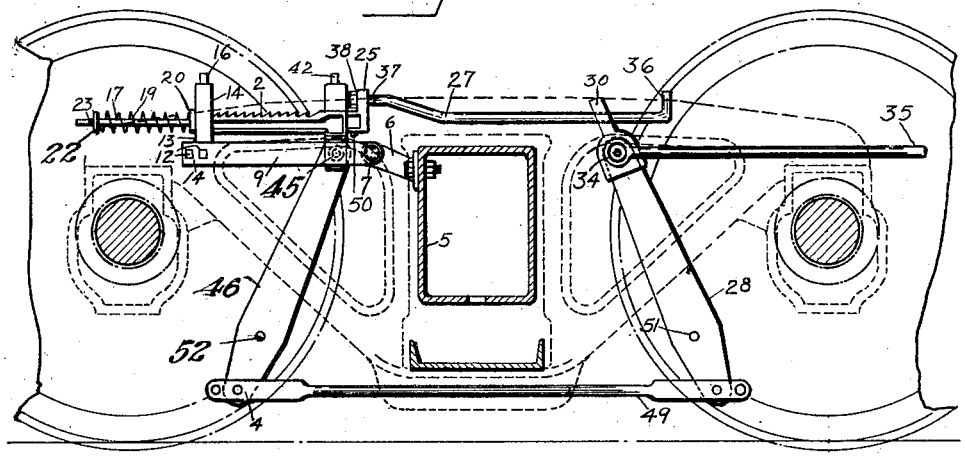
Figure 2:
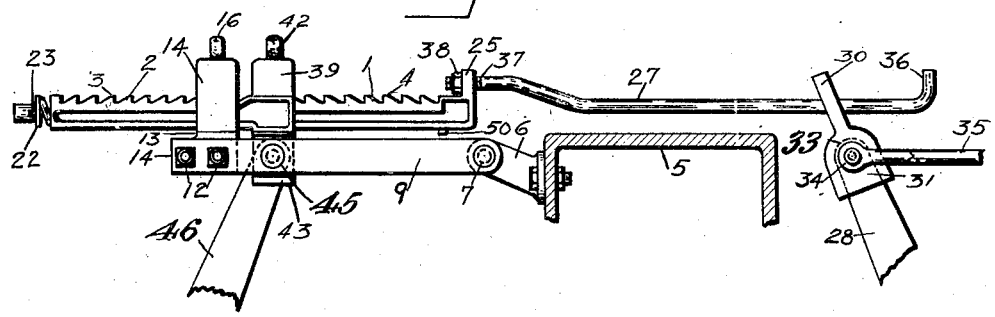
Fig. 2 is a fragmentary detail view showing the position of the adjuster and the position of the dead lever when the brake shoes are worn off.
Figure 3:
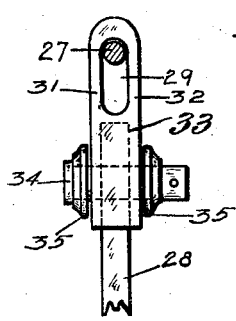
Fig. 3 is a fragmentary end view of the top of the live truck lever showing the connection to the tie rod as shown in Fig. 2;

Fig. 9 is a detail view in plan of the crosshead guide and means for holding the pin in the dead lever.

Similar reference numerals refer to similar parts throughout the entire description.

As shown in the drawings, my device consists of two racks 1 and 2, each rack is provided with a plurality of ratchet teeth 3 and 4 which are inclined in opposite directions. A truck bolster 5, of standard construction, is provided with a dead lever fulcrum connection 6. This connection is provided with a pin 7 which pivotally secures two guide straps 8 and 9, to the fulcrum 6, the outer ends 10 and 11 of these straps are secured by means of bolts 12 to a stationary housing 13. The housing 13 as more clearly seen in Figs. 4 and 6, is provided with an upwardly extending portion 14, in which is mounted a gravity actuated pawl 15, which is adapted to engage the ratchet teeth formed on the rack 2, convenient means of manually disengaging the pawl 15 is provided by an eyebolt 16 which extends through the top wall of the upwardly extending portion 14 and is screwed into the gravity pawl 15. The rack 1 is provided with an extension 17, which is preferably round in cross-section, which extends through a laterally extended portion of the housing 13. Upon this round portion 17, of the rack 1, I mount a compression spring 19, one end 20 of which bears against the upwardly extending portion 14 of the stationary housing 13, the other end being secured in place by a washer 22 which is prevented from longitudinal movement by means of a pin 23 mounted adjacent the end of the round extension 17 of the rack 1.

The other end 24 of the rack 1 is provided with an upwardly extending lug 25. This lug 25 is provided with a central aperture 26 in which is mounted a tie rod 27 which connects the rack 1 with the truck live lever 28. The rod 27, passes through a slot formed in the upward part of a connecting member 30, the lower end of which is forked or bifurcated, the two prongs 31 and 32 extending over the upper end 33 of the live truck lever 28, being secured thereto by the usual brake pin 34 which also connects the truck live lever to the top rod 35. This rod 35 is connected to the standard floating or cylinder lever (not shown) in the usual manner. The end 37 of the rod 27 is threaded and passes through the aperture 26 in the lug 25 and is secured in position by means of a nut 38.

The toothed portion of the rack 1 is slidably mounted in the upwardly extending portion 39 of a cross head 40, the gravity actuated pawl 41 is mounted in the upwardly extending portion 39 and is adapted to engage the ratchet teeth of the rack 1. Convenient means for manually disengaging the pawl from the ratchet teeth is provided by an eye-bolt 42 similar to the eye-bolt 16. The cross head 40 is provided with guides 43 and 44 on opposite sides which are adapted to receive the two straps 8 and 9 upon which the cross head slides. The upper end 45 of the truck dead lever 46 is secured to the cross head by means of a headless pin 47, the straps 8 and 9 serving to hold this pin in position. The cross head 40 forms one end of the rack 2, the other end being slidably mounted in the stationary housing 13 which is fastened to the straps 8 and 9 by the bolts 12. The lower end of the truck dead lever 46 is connected to the lower end of the live truck lever 28 by a bottom rod 49 of the usual standard construction. Both of these levers are supplied with the standard brake beam connections 51 and 52 for mounting the brakes (not shown). The assembly, and operation of the device is as follows:

It is first necessary to determine the length, of the tie rod 27, from the lug 25 to the upturned end 36. This is ascertained by installing new brake shoes all around. The brake rigging is then squared up so that both cylinder and floating levers are in right angles with the center line of the car and the two truck live levers are in a vertical position. The air is then set with the usual 50 lbs. The distance is then ascertained from the lug 25 on the rack 1 to the connecting member 30 at the top of the live lever 28. The end 36 of the tie rod 27 is then bent up so that any additional movement, of the truck live lever, will pull on this tie rod and as a consequence will move the rack 1.

This tie rod does not need to be as heavy as the brake rods inasmuch as the only load which it carries is the tension of the coil spring 19 on the round end of the rack 1.

The length of the two straps 8 and 9 is determined by the distance from the center of the pin 7 to the center of the pin 47 which will vary on different cars. When this has been determined and the straps of the requisite size are installed the device will operate as follows:

As soon as the shoes wear the live lever 28 will move toward its wheel axle and this will pull on the connecting rod 27 and will cause the rack 1 to move under the gravity pawl 41 which will, if there is any slack, engage the next adjacent tooth on the rack. As soon as the brakes are released the spring 19 will pull the rack 1 back and at the same time will pull the rack 2 and the dead lever 46 back so that the gravity pawl 15 will drop into the correct tooth thereby holding the dead lever 46 in exactly the same relation to the wheels as that occupied by the live lever 28. When the brake shoes are worn out and it becomes necessary to apply a new set of shoes, all that is necessary to do is, for the car repairer to lift the two gravity pawls 15 and 41 and push the rack 2 and dead lever 46 towards the truck bolster until the rack 2 strikes a stop lug 50 cast or formed, on the rack 2 adjacent the lug 25, when the device is again ready to operate. In my device there are no cotter keys and no brake pins to be removed.

The convenience of this will be apparent to persons skilled in the art because the car repairer is accustomed to going to the familiar place, i. e. the dead lever fulcrum, but instead of removing the usual brake pin and cotter keys and changing the dead lever to another hole in the dead lever fulcrum connection, all he has to do is to lift the pawls, as above set forth, and return the parts to their original position.

Though I have described a specific type of device, I do not wish to be understood as limiting myself thereto as the drawings are furnished solely to illustrate a preferred embodiment of my invention and I do not desire to be understood as limiting myself except as such limitations may appear in the hereinafter appended claims.

Having described my invention, what I regard as new, and desire to secure by Letters Patent of the United States, is:

1. The combination with a brake rigging, having top rods, truck live and dead levers, and their connections, of guide straps secured to the bolster of a car, a stationary housing fixedly secured to said straps, a cross head slidably mounted on said straps, a rack bar secured to said cross head and slidable in said housing, a pawl which engages the teeth of said rack bar mounted in said housing, means to connect said cross head to the truck dead lever, a second rack bar slidably mounted in said cross-head, a pawl mounted in said cross head which engages the teeth of said second rack bar, means to connect said second rack bar to the truck live lever, a stop on said second rack bar, an extension on said rack slidably mounted in said housing, a spring on said extension which holds it normally projected from said housing, and means to connect said truck live lever to a top rod.

2. The combination with a brake rigging, having top rods, truck live and dead levers and their connections, of a stationary housing, a slidable cross-head, guides on which said cross head slides, a rack bar secured to said cross head and slidable in said housing, a pawl which engages the teeth of said rack bar mounted in said housing, means to connect said cross head to the truck dead lever, a second rack bar slidably mounted in said cross head, a pawl mounted in said cross head which engages the teeth of said second rack bar, means to connect said second rack bar to the truck live lever, a stop on said second rack bar, an extension on said second rack bar slidably mounted in said housing, a spring on said extension which holds it normally projected from said housing, and means to connect said lever to a top rod.

3. The combination with a brake rigging, having top rods, truck live and dead levers and their connections, of a stationary housing, a slidable cross head, guides on which said cross head slides, a rack bar secured to said cross head and slidable in said housing, a pawl which engages the teeth of said rack bar mounted in said housing, means to connect the cross head to the truck dead lever, a second rack bar slidably mounted in said cross head, a pawl mounted in said cross head which engages the teeth of said second rack bar, means to connect said second rack bar to the truck live lever, a stop on said second rack bar, an extension on said second rack bar slidably mounted in said housing, yieldable means to hold said extension normally projected from said housing, and means to connect said lever to a top rod.

4. The combination with a brake rigging, having top rods, truck live and dead levers and their connections, of guide straps secured to the bolster of a car, a stationary housing fixedly secured to said straps, a cross head slidably mounted on said straps, a rack bar secured to said cross head and slidable in said housing, a pawl which engages the teeth of said rack bar mounted in said housing, means to connect said cross head to the truck dead lever, a second rack bar slidably mounted in said cross head, a pawl mounted in said cross-head which engages the teeth of said second rack bar, a connecting member secured to the top of the truck live lever having an aperture therethrough, a tie-rod detachably secured to said second rack bar, said rod passing through said aperture, means on said tie-rod which engages said member at a predetermined time, a stop on said second rack bar, an extension on said second rack slidably mounted in said housing, means to hold said extension normally projected from said housing, and means to connect said truck live lever to a top rod.

5. The combination with a brake rigging, having top rods, truck live and dead levers and their connections, of guides secured to the bolster of a car, a stationary housing, a cross head slidable on said guides, a rack bar secured to said cross head, and slidable in said housing, a pawl which engages the teeth of said rack bar, mounted in said housing, means to connect said cross head to the truck dead lever, a second rack bar slidably mounted in said cross head, a pawl mounted in said cross head which engages the teeth of said second rack bar, adjustable means to connect said rack bar to the truck live lever, a stop on said second rack bar, an extension on said second rack bar slidably mounted in said housing, means to hold said extension normally projected from said housing and means to connect said truck live lever to a top rod.

6. The combination with a brake rigging, having top rods, truck live and dead levers and their connections, of a stationary housing, a crosshead in a predetermined spaced relation thereto, a rack bar secured to said crosshead and slidable in said housing, a pawl in said housing to engage said rack bar, means to connect said crosshead to the dead lever, a second rack bar having operative connection with the live lever slidable in said cross head, a pawl in said cross head to engage said second rack bar, automatic means to permit the wearing of the brake shoe to shift the position of said crosshead with relation to said housing.

7. The combination with a brake rigging, having top rods, truck live and dead levers and their connections, of a stationary housing, a crosshead in a predetermined spaced relation thereto, guides for said crosshead, a rack bar secured to said crosshead and slidable in said housing, a pawl in said housing to engage said rack bar, means to connect said crosshead to the dead lever, a second rack bar having operative connection with the live lever slidable in said crosshead, a pawl in said crosshead to engage said second rack bar, automatic means to permit the wearing of the brake shoe to shift the position of said crosshead with relation to said housing.

8. The combination with a brake rigging, having top rods, truck live and dead levers and their connections, of a stationary housing, a crosshead in a predetermined spaced relation thereto, guides for said crosshead, means to secure said housing to said guides, a rack bar secured to said crosshead and slidable in said housing, a pawl in said housing to engage said rack bar, means to connect said crosshead to the dead lever, a second rack bar having operative connection with the live lever slidable in said crosshead, a pawl in said crosshead to engage said second rack bar, automatic means to permit the wearing of the brake shoe to shift the position of said crosshead with relation to said housing.

HARLEY E. ANDERSON.